(12) United States Patent
Chao et al.

(10) Patent No.: US 6,882,339 B2
(45) Date of Patent: Apr. 19, 2005

(54) ELECTROMAGNETIC INDUCTION SYSTEM WITH SINGLE-INDUCTION-LOOP MULTI-INDUCTION-LOOP

(75) Inventors: Ching-Chuan Chao, Taipei (TW); Chih-An Chen, Taipei (TW); Shi-Hao Cheng, Taipei (TW)

(73) Assignee: Aiptek International Inc., Hsin-Chu (TW)

( * ) Notice: Subject to any disclaimer, the term of this patent is extended or adjusted under 35 U.S.C. 154(b) by 261 days.

(21) Appl. No.: 10/338,545

(22) Filed: Jan. 8, 2003

(65) Prior Publication Data

US 2004/0130534 A1 Jul. 8, 2004

(51) Int. Cl.[7] ............................................. G09G 5/00
(52) U.S. Cl. ...................... 345/174; 345/179; 178/18.07
(58) Field of Search ............................... 345/156, 157, 345/173, 174, 179; 178/18.01, 18.03, 18.05, 18.07, 19.03; 343/741, 742

(56) References Cited

U.S. PATENT DOCUMENTS 5,635,684 A * 6/1997 Fukuzaki ................. 178/18.07
5,792,997 A * 8/1998 Fukuzaki ................. 178/18.07
6,005,555 A * 12/1999 Katsurahira et al. ........ 345/174
6,636,184 B1 * 10/2003 Yeh ............................ 343/867

* cited by examiner

Primary Examiner—Dennis-Doon Chow
(74) Attorney, Agent, or Firm—Clement Cheng

(57) ABSTRACT

A plurality of single-induction-loops are inserted in an electromagnetic induction system in which multi-induction-loop is deployed. Deployment of a multi-induction-loop layout is constituted by induction loops with sawtooth-shaped areas and close-like areas formed by ⊓-type sections of same and opposite phases for reducing the number of switch in use, completely deploying induction loops of X axis and Y axis on a same common contact, effectively reducing area demand of electromagnetic induction system, and thus increasing effective area of panel board in use. Moreover, in order to further enhance ability of interference immunity of electromagnetic induction system, a plurality of single-induction-loops are inserted around multi-induction-loop for isolating interference of noise to multi-induction-loop and thus relatively increasing linearity and efficiency of electromagnetic induction system.

20 Claims, 8 Drawing Sheets

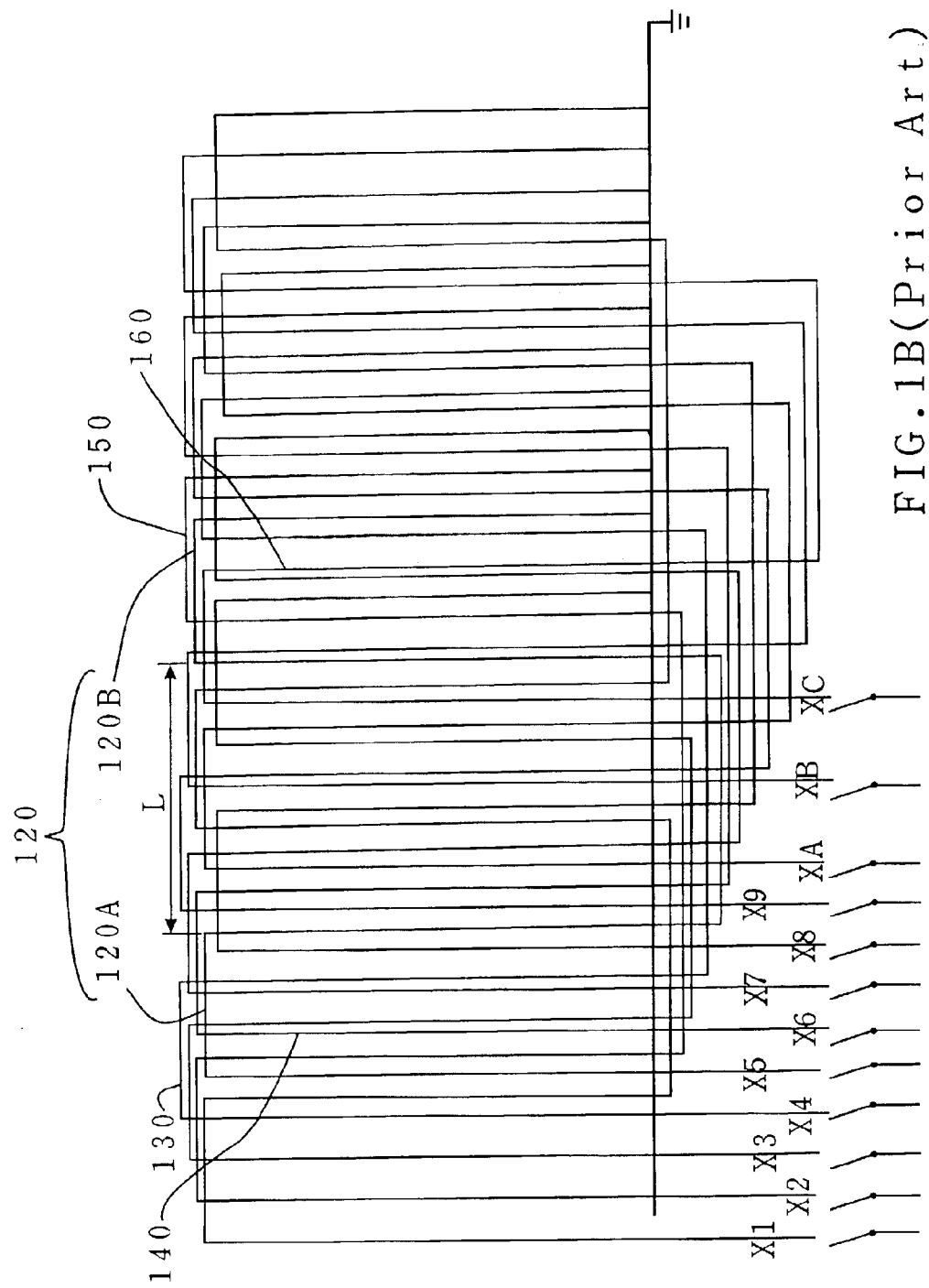

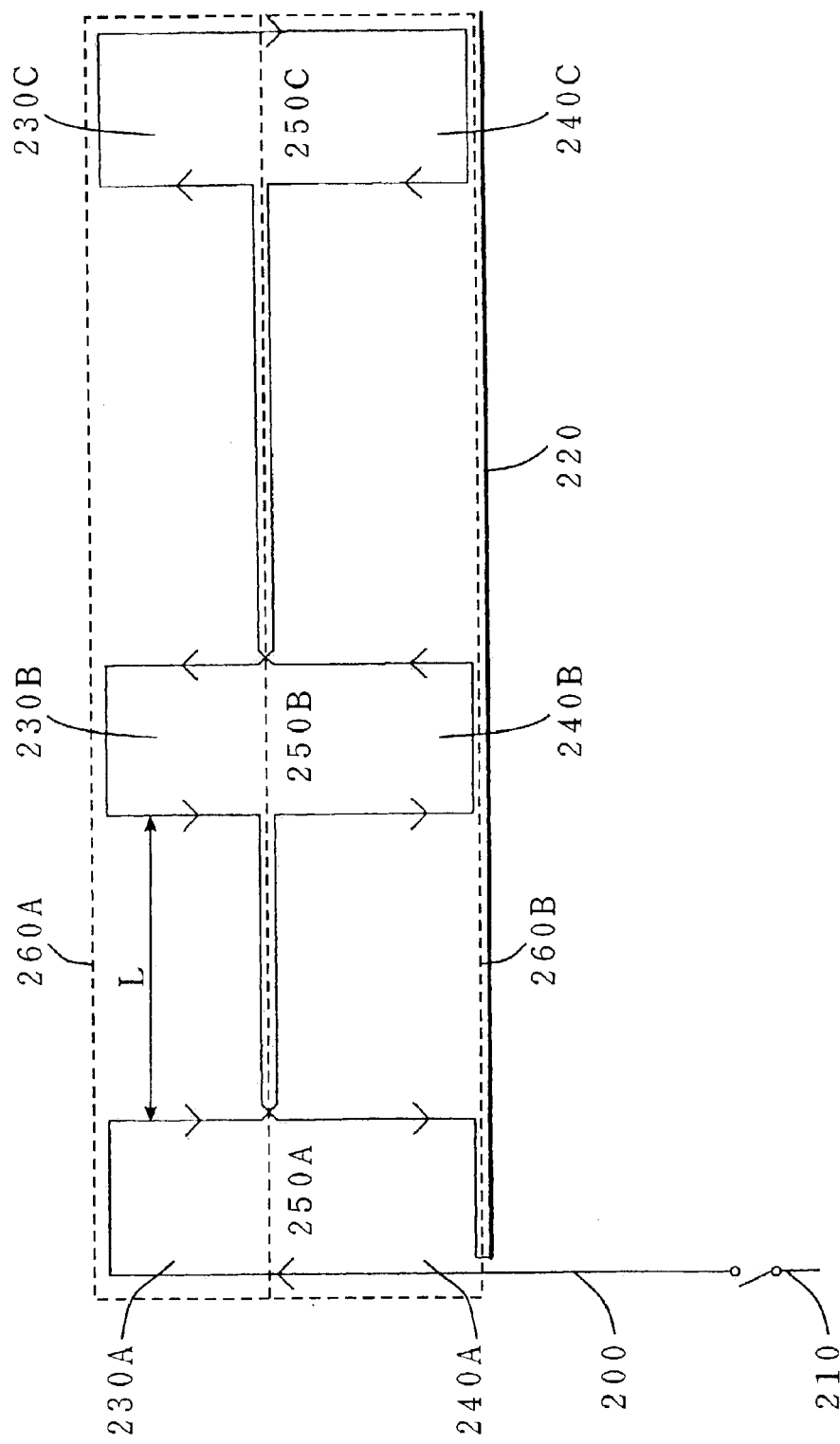

ELECTROMAGNETIC INDUCTION SYSTEM WITH SINGLE-INDUCTION-LOOP MULTI-INDUCTION-LOOP

BACKGROUND OF THE PRESENT INVENTION

1. Field of the Present Invention

The present invention relates to an electromagnetic induction system of induction loop, and more particularly, to an electromagnetic induction system with single-induction-loops and multi-induction-loop.

2. Description of the Prior Art

Since a handwriting input device can replace a mouse and allow users to input words and pictures by hand, more easily than a mouse, the field of improvement of a handwriting input device has developed rapidly in recent years. The early handwriting input device replaces a mouse with a pen. In order to increase the convenience of operation for the user, a cordless pointer device, such as a pen, a mouse or a stylus, and a digitizer tablet are usually used. The tip of the cordless pen or stylus corresponds with the left key of the mouse. Although conventional pen-input products have existed for several years, similar kinds of products generally focus on the application of a single function such as graphing, drawing or Chinese text key-in.

The conventional electromagnetic induction system is equipped with a digitizer tablet and a mouse or pen-transducer/pointer device. Generally speaking, there are two modes for presenting the position the pointer device located on the active area of the tablet: the relative mode and the absolute mode. The conventional mouse device generally functions in the relative mode, that is to say, when the mouse glides on the active area of digitizer tablet, the computer system receives an input from the mouse and it can only identify the relative movement in X and Y directions. A common technique is to implement a pair of mutually perpendicular altering signals in the mouse with an induction device, the pair of signals corresponding to the longitudinal and transverse movement of the mouse. In contrast, the cursor device of the tablet, such as cordless pointer device, generally functions in the absolute mode. As far as the computer system is concerned, once the pointer device is operated and moved to another place on the active area of the tablet, the signal changes in order to respond to a new absolute coordinates of the pointer device. Nowadays, there have already been several methods for positioning the pointer device on the active area of the tablet, and the electromagnetic field induction technique is the technique that generally applies to the absolute mode. The early transducer/pointer devices were connected to the tablet with multi-conductor wires, delivering the information of coordinates and switch/pressure status to the computer system with interface. Some cordless transducers/pointer devices in the prior art indicated the use of different functions by changing the frequency and/or phase, the functions included, pressing down the button, pressing the tip of the pointer device on the active area, and other similar functions. However, without careful handling, the change in frequency could easily cause misjudgment in the desired function of the pointer device because of various external factors such as metallic objects, noise signals, exterior electromagnetic fields, etc. These problems become extraordinarily obvious when it comes to tablets of larger size. The conventional technique for improvement made to the tablet system allows users to operate the pointer device with tablet system in dual mode, and therefore the information regarding relative mode and absolute mode can both be provided under the user's control.

The current pointer/input product is usually an electromagnetic induction system. The electromagnetic induction system usually comprises an electromagnetic pointer device and a digitizer tablet. The electromagnetic pointer device has a battery that provides energy for transmitting the relative electromagnetic signal and an oscillation circuit. Take the electromagnetic pointer device for example, when the tip of the pointer device is pressed, the inductance of the inductor changes, therefore the oscillation frequency also changes. The higher the pressure received by the pointer device is, the greater the inductance changes, and thus the greater the oscillation frequency changes. Therefore the amount of the pressure exerted upon the tip of the pointer device can be obtained through the changing degree of frequency. There are also two switch keys on the side of the cordless pointer device; the on/off status of switch keys changes connecting/disconnecting status of a specific capacitor in the oscillation circuits, and thus changes the transmitting frequency. When the user presses a switch key, it can be identified through detecting the variation of frequency. The tablet also comprises elements such as a detective loop, an amplifier, and an ADC and so on. The central writing area of this conventional handwriting tablet is plaited by induction loops, the layout being composed of double layers of a PCB and the induction loops with two axial arranged in an array of equal distance. The major use of these induction loops is to induce the electromagnetic signal transmitted by the electromagnetic pointer device. When the electromagnetic pointer device transmits the electromagnetic signal, these induction loops will induce the electromagnetic signal and the microprocessor will receive the processed information of the pointer device through a signal processing circuit.

Generally speaking, the induction loops of the conventional electromagnetic induction device and its layout design makes the induction loops a grid net with the X and Y axis arranged in an array at equal distance in order to induce the signal emitted from the electromagnetic pointer device and figure out its absolute coordinates. Referring to the induction loops layout deployed according to the X direction of a two-dimensional orthogonal coordinates indicated in FIG. 1A. One terminal of each direction loop 110A is connected respectively with one switch (from X1 to X25). The other terminal is connected with the common ground node 115, through which, the signal induced by each direction loop 110A can be obtained by controlling the switches X1 to X25 in order. Since the intensity of the magnetic field is an inverse proportion to the square of distance, the farther the distance between the electromagnetic pointer device that's transmitting the electromagnetic field and the induction loops, the weaker is the signal induced by the induction loops; in contrast, the nearer the distance between the electromagnetic pointer device that's transmitting the electromagnetic field and the induction loops, the stronger is the signal induced by the induction loops. Therefore, as long as the microprocessor of the tablet can scan through all the induction loops one by one in sequence, and analyze the strength of the signals induced by each induction loop, the induction loops in which dominates the range the electromagnetic pointer device located can be identified. The coordinates of its position can be figured out. However, as far as a tablet of a larger size is concerned, the number of induction loops arranged also increases, and therefore more loop switches are needed. In order to eliminate the defect of too many switches, the inventor of the present invention provides a method of increasing ⊓-type sections of induction loop for reducing the number of switches. As is shown in FIG. 1B, each induction loop (X1–X9 and XA–XC) is deployed in the direction of X axis of right-angled coordinates and is respectively composed by a plurality of ⊓-type sections 120. As far as each induction loop (X1–X9 and XA–XC) deployed in the same direction is concerned, each ⊓-type section 120 and other adjacent ⊓-type sections of it belong to different induction loops; therefore, the ⊓-type section on which locates the electromagnetic pointer device can be identified. For example, a ⊓-type section 120A of induction loop X5 and other adjacent ⊓-type sections 130 and 140 of induction loops of it belong respectively to induction loops X4 and X6. Besides, another ⊓-type section 120B of induction loop X5 and other adjacent ⊓-type sections 150 and 160 of induction loops of it belong respectively to induction loops X2 and XC. When the electromagnetic pointer device is located on ⊓-type section 120A or 120B of induction loop X5, whether the ⊓-type section on which locates the electromagnetic pointer device is 120A or 120B can be identified by referring signals produced by its adjacent induction loops X4, X6, XC, and X2. Therefore, according to what is said above, the number of switch in FIG. 1A (totaling 25 switches) is higher than that in FIG. 1B (totaling 12 switches). Besides, in conventional induction loop deployment, the distance between two adjacent ⊓-type sections of a same induction loop has to be noticed. Take distance "L" between two adjacent ⊓-type sections 120A and 120B of induction loop X5 for example, if the distance L is too short, misjudgment can be caused easily while identifying the location of electromagnetic pointer device.

On the other hand, the development of current information products is aimed at a high-speed and high data rate process with multiple and excellent functions. But as the speed of processing and data rate increase, the phenomenon of electromagnetic interference will happen often. Especially when the electromagnetic induction system is combined with other electronic devices in one system, the marginal part of induction loops will be interfered very easily by inductive electromagnetic fields. For example, when the induction loop is put on a Liquid Crystal Device Monitor Panel (LCD Monitor Panel), the marginal induction loop of electromagnetic induction system will be affected by electromagnetic interference made by Thin-Film Transistor (TFT) Driving IC on Liquid Crystal Device Monitor Panel and Power Inverter that lights up tube of LCD. Therefore, when LCD Monitor Panel is in operation, a variance electromagnetic field will form on the panel, which causes unbalanced deployment of induction loop magnetic field on the margin of electromagnetic induction system. As a result, when the induction loop receives signal, the electromagnetic field interferes the induction of induction loop, and thus causes poor linearity of marginal induction loop.

The above-mentioned problems are actually unavoidable as far as systems using induction loops are concerned. Especially when it comes to the tablet of a larger active area demanded in commerce, the number of its induction loops increases. Therefore, when the marginal induction loop is interfered by electromagnetic wave, the electromagnetic noise will also interfere other loop partitions following deployment of induction loop, which causes poor linearity of multi partitions and deteriorates quality of the electromagnetic induction system.

SUMMARY OF THE INVENTION

As is described in the background of the present invention above, in order to enhance ability of interference immunity of electromagnetic induction system and retain function of multi-induction-loop of electromagnetic induction system, the present invention provides an electromagnetic induction system having single-induction-loops and multi-induction-loop, which is used for enhancing the ability of interference immunity of the above-mentioned electromagnetic induction system.

The main purpose of the present invention is to provide an electromagnetic induction system with deployment of multi-induction-loop in which are added a plurality of single-induction-loops. A multi-induction-loop is constituted by induction loops with sawtooth-shaped areas and close-like areas formed by ⊓-type sections of same and opposite phases for reducing the number of switch in use, completely deploying induction loops of X axis and Y axis on a same common contact, effectively reducing spatial demand of electromagnetic induction system, and thus increasing effective area of panel board in use. Moreover, in order to further enhance ability of interference immunity of electromagnetic induction system, a plurality of single-induction-loops are inserted around multi-induction-loop for isolating interference of noise to multi-induction-loop and thus relatively increasing linearity and efficiency of electromagnetic induction system.

According to the purpose described above, the present invention discloses an electromagnetic induction system with single-induction-loop and multi-induction-loop, comprising: a single-induction-loop, deployed along left and right sides of X axis and upper and lower side of Y axis, one end being electrically coupled with a first switch assembly and the other end being electrically coupled with a common contact to form an independent ⊓-type section. And a multi-induction-loop, further comprising: a plurality of first induction loops, deployed in the direction of X axis, one end being electrically coupled with a second switch assembly and the other end being electrically coupled with a common contact, each of first induction loops having a plurality of close-like areas; a plurality of second induction loops, deployed in the direction of Y axis, one end being electrically coupled with a third switch assembly and the other end being electrically coupled with a common contact, each of second induction loops having a plurality of close-like areas. And a common contact, being electrically coupled with single-induction-loop and a plurality of first induction loops and a plurality of second induction loops respectively. And a first switch assembly, which is electrically coupled with a plurality of single-induction-loops, a second switch assembly, which is electrically coupled with a plurality of first induction loops, and a third switch assembly, which is electrically coupled with a plurality of second induction loops.

BRIEF DESCRIPTION OF THE DRAWINGS

FIG. 1B is a diagram of electromagnetic induction system having multi-induction-loop;

FIG. 3B is a diagram of induction loops having close-like areas of opposite phases according to embodiment of the present invention;

DESCRIPTION OF THE PREFERRED EMBODIMENT

Figure 1A:
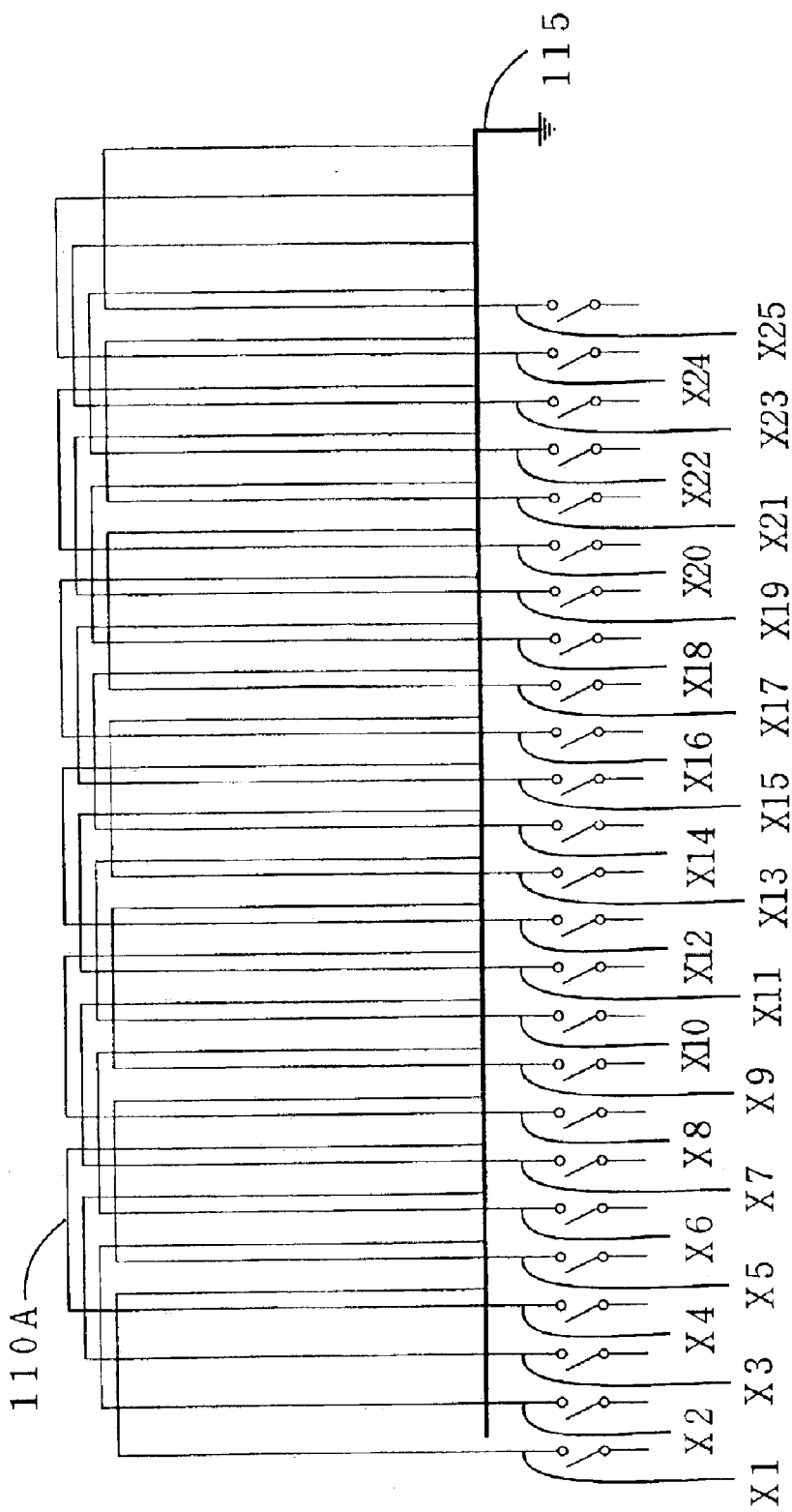
FIG. 1A is a diagram of deployment of induction loop layout in the direction of x-axis in conventional electromagnetic induction system.

What is probed into in the present invention is an electromagnetic induction system with single-induction-loop and multi-induction-loop. A complete process is not included in the following description of induction loop. The prior art continually used in the present invention is only quoted in summary here to support description of the present invention. And, relative drawings in the following text are not made according to practical proportion, the function of which is only to express features of structure of the present invention. Obviously, the application of the present invention is not confined to specific details familiar to those who are skilled in electromagnetic induction system. On the other hand, the common elements and procedures that are known to everyone are not described in the details to avoid unnecessary limits of the present invention. The preferred embodiment of the present invention will be described in detail in the following. However, besides this embodiment, with detailed description, The present invention can also be applied extensively to other embodiments. The scope of the present invention is not being defined by this preferred embodiment, but by the appended claims.

The present invention discloses an electromagnetic induction system with single-induction-loop and multi-induction-loop, comprising: a single-induction-loop, deployed along left and right sides of X axis and upper and lower side of Y axis, one end being electrically coupled with a first switch assembly and the other end being electrically coupled with a common contact to form an independent ⊓-type section. And a multi-induction-loop, further comprising: a plurality of first induction loops, deployed in the direction of X axis, one end being electrically coupled with a second switch assembly and the other end being electrically coupled with a common contact, each of first induction loops having a plurality of close-like areas; a plurality of second induction loops, deployed in the direction of Y axis, one end being electrically coupled with a third switch assembly and the other end being electrically coupled with a common contact, each of second induction loops having a plurality of close-like areas. And a common contact, being electrically coupled with single-induction-loop and a plurality of first induction loops and a plurality of second induction loops respectively. And a first switch assembly, which is electrically coupled with a plurality of single-induction-loops, a second switch assembly, which is electrically coupled with a plurality of first induction loops, and a third switch assembly, which is electrically coupled with a plurality of second induction loops.

The present invention further discloses an electromagnetic induction system with single-induction-loop and multi-induction-loop, comprising: a single-induction-loop, two single induction loops deployed respectively along left and right sides of X axis and upper and lower side of Y axis, one end being electrically coupled with a first switch assembly and the other end being electrically coupled with a common contact to form an independent ⊓-type section. A multi-induction-loop, further comprising: a plurality of first induction loops, deployed in the direction of X axis, one end being electrically coupled with a second switch assembly and the other end being electrically coupled with a common contact, each of the first induction loops having a plurality of close-like areas; a plurality of second induction loops, deployed in the direction of Y axis, one end being electrically coupled with a third switch assembly and the other end being electrically coupled with a common contact, each of the second induction loops having a plurality of close-like areas. A common contact, being electrically coupled with single-induction-loop and a plurality of first induction loops and a plurality of second induction loops respectively. And a first switch assembly, electrically coupled with the plurality of first single-induction-loops, a second switch assembly, electrically coupled with the plurality of first induction loops, and a third switch assembly, electrically coupled with the plurality of second induction loops.

Figure 2A:
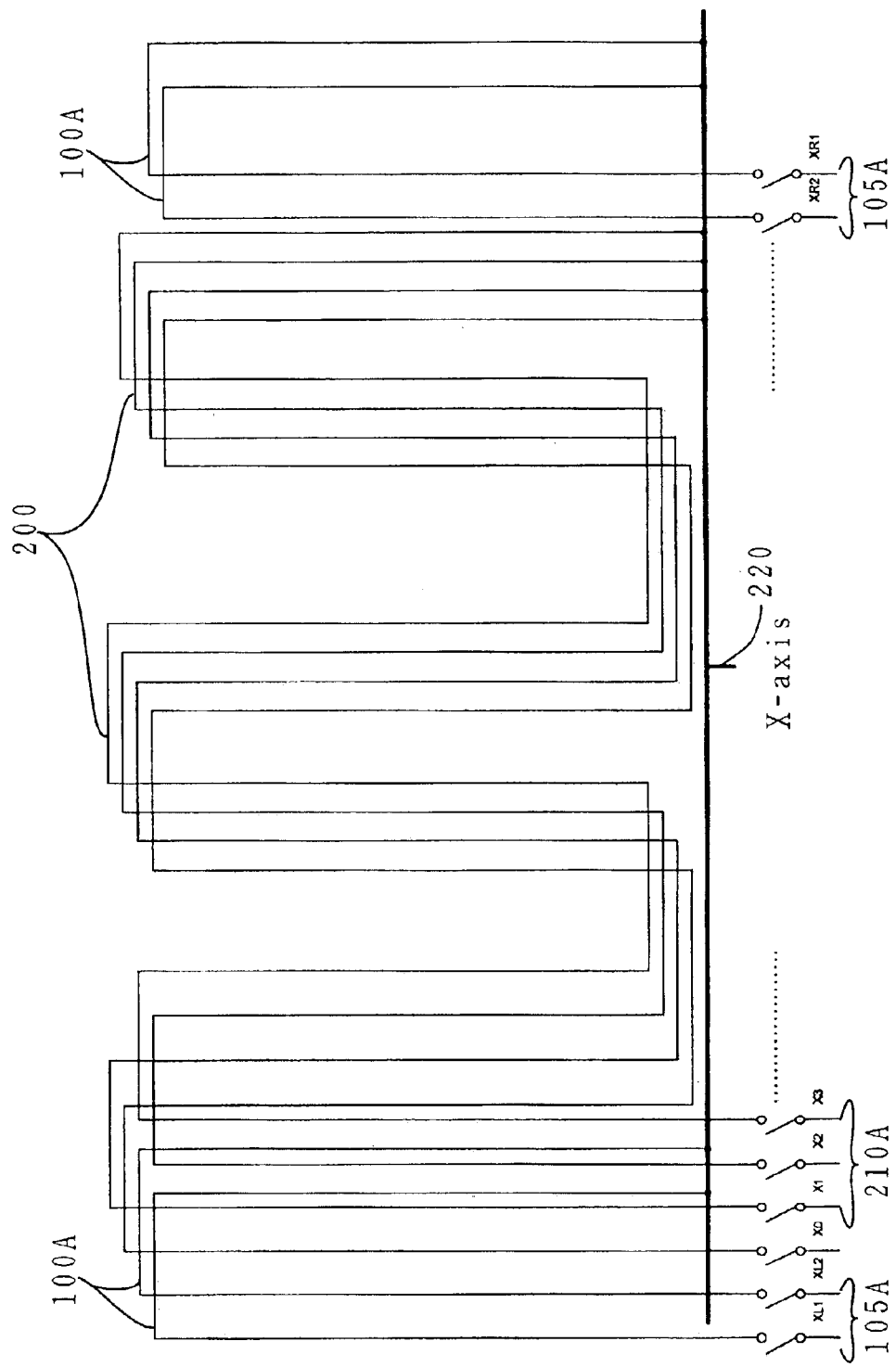
FIG. 2A is a diagram of deployment of single-induction-loops on X axis of the present invention.
Figure 2B:
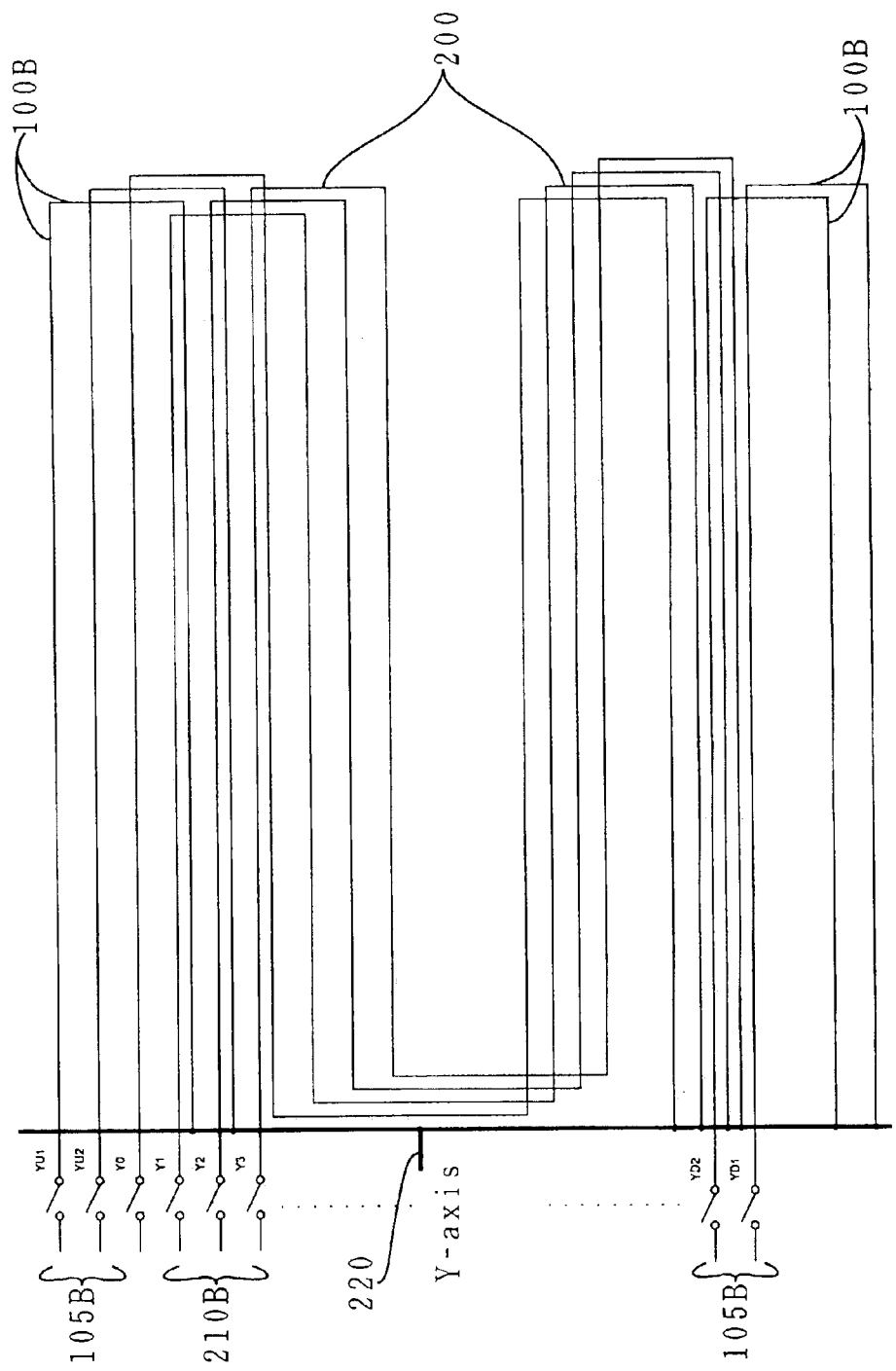
FIG. 2B is a diagram of deployment of single-induction-loops on Y axis of The present invention.
Figure 2C:
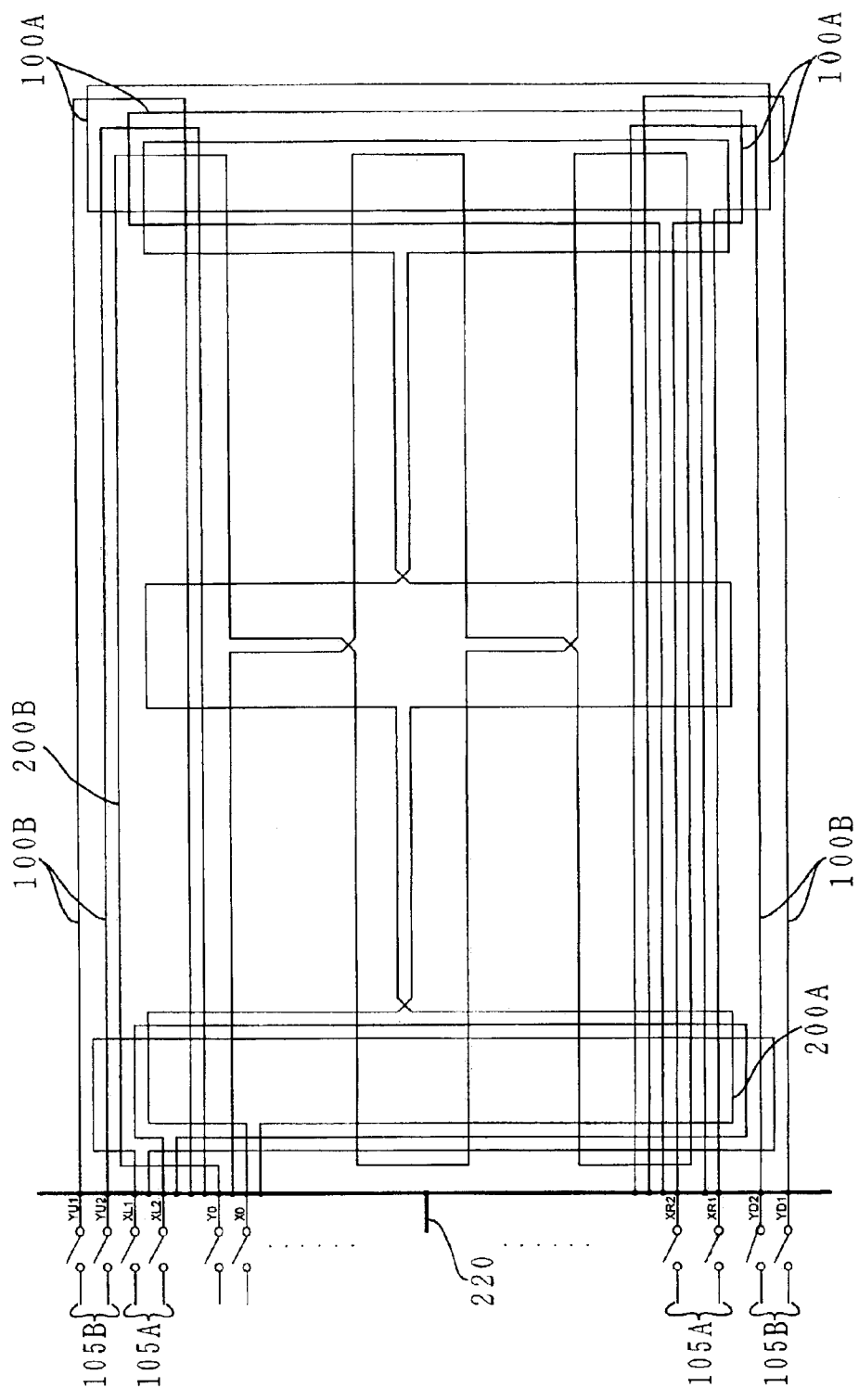
FIG. 2C is a diagram of deployment of single-induction-loops and multi-induction-loop in electromagnetic induction system according to the present invention.

In the following is detailed description of embodiments of the present invention. What is first described is about single-induction-loop, also referring to FIG. 2A to FIG. 2C. In FIG. 2A is deployment of single-induction-loop 100A of the present invention in the direction of X axis, a plurality of single induction loops 100A being deployed respectively on the left-most side and the right-most side of X axis. One end of the single induction loop 100A is connected with an analog switch 105A, and the other end of it is connected with a common contact 220. And, between single-induction-loops 100A is space for deployment of induction loop 200, ⊓-type section of single-induction-loops 100A overlapping ⊓-type section of induction loop 200. In FIG. 2B is deployment of single-induction-loop 100B of the present invention in the direction of Y axis, a plurality of single induction loops 100B being deployed respectively on the uppermost side and the lowermost side of Y axis. One end of the single induction loop 100B is connected with an analog switch 105B, and the other end of it is connected with a common contact 220. And, between single-induction-loops 100B is space for deployment of induction loop 200, ⊓-type section of single-induction-loops 100B also overlapping ⊓-type section of induction loop 200. FIG. 2C is a diagram of practical deployment of single-induction-loops of the present invention in electromagnetic induction system.

Figure 3A:
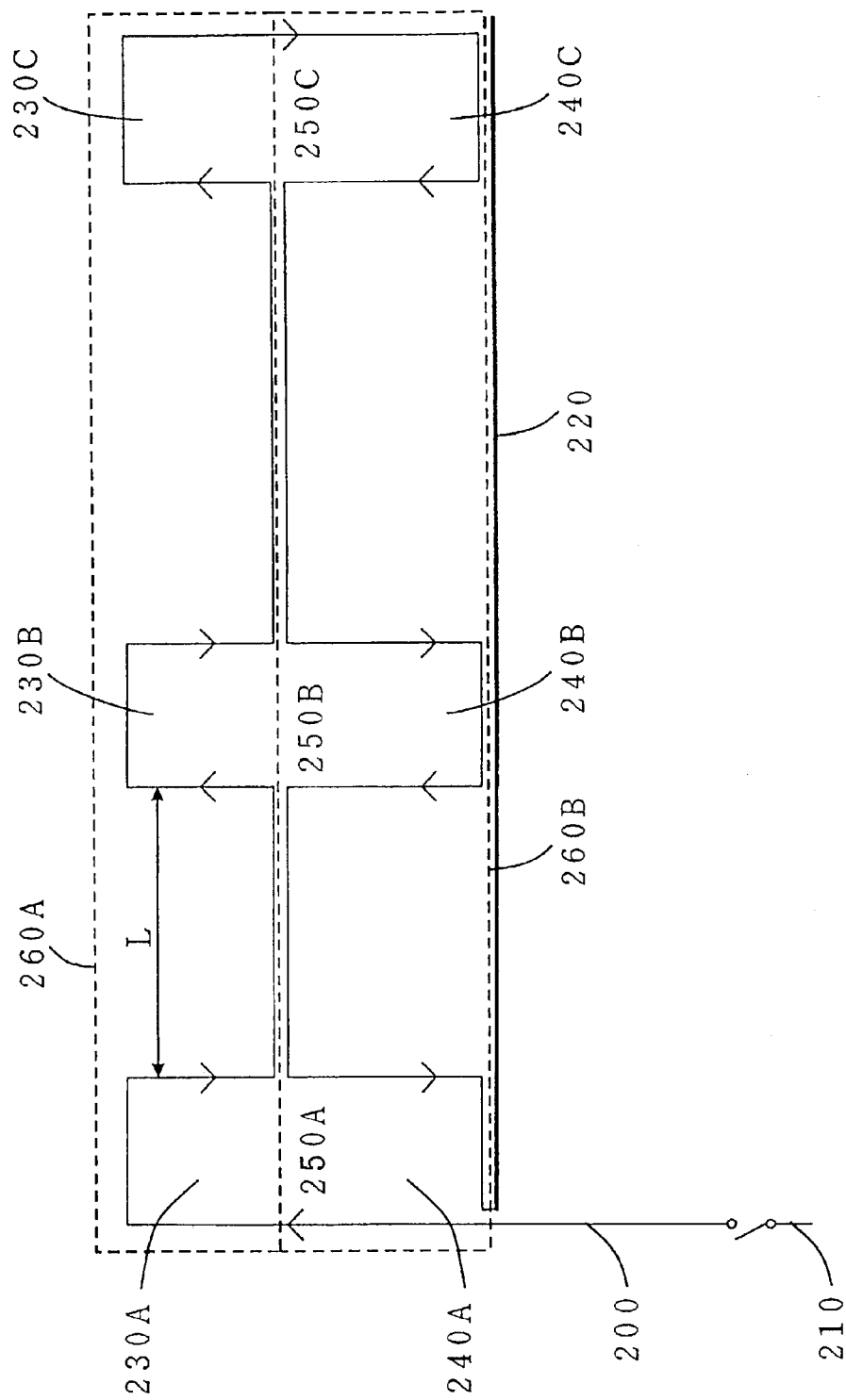
FIG. 3A is a diagram of induction loops having close-like areas of the same phases according to embodiment of the present invention.

What is described in the following is about multi-induction-loop of the present invention, referring to FIG. 3A to FIG. 3C. In FIG. 3A is multi-induction-loop 200, in which one end of multi-induction-loop 200 is electrically connected with a switch 210 and the other end of multi-induction-loop 200 is electrically connected with a common contact 220. The multi-induction-loop 200 comprises a plurality of ⊓-type sections, such as first ⊓-type section 230A, second ⊓-type section 230B, third ⊓-type section 230C, and fourth ⊓-type section 240C, fifth ⊓-type section 240B, and sixth ⊓-type section 240A. A plurality of ⊓-type sections 230A to 230C forms a first sawtooth-shaped area 260A, and a plurality of ⊓-type sections 240A to 240C forms a second sawtooth-shaped area 260B; the second sawtooth-shaped area 260B and the first sawtooth-shaped area 260A form a face-to-face closed induction loop. Each ⊓-type section 230A to 230C respectively faces each ⊓-type section 240A to 240C to form respectively close-like areas 250A to 250C.

Referring to FIG. 3A still, when the plurality of close-like areas 250A to 250C have the same phase (or in phases), the above-mentioned multi-induction loop 200 is formed in an un-staggered way, which is described as follows: first, the induction loop 200 extends upwardly from the switch 210 and form first ⊓-type section 230A, then, it extends through first ⊓-type section 230A and forms second ⊓-type section 230B and third ⊓-type section 230C in order. The first ⊓-type section 230A, second ⊓-type section 230B, and third ⊓-type section 230C are connected with each other orderly to form first sawtooth-shaped area 260A, and the indents of first ⊓-type section 230A, second ⊓-type section 230B, and third ⊓-type section 230C open toward a same direction. Then, multi-induction-loop 200 extends downwardly from third ⊓-type section 230C to form fourth ⊓-type section 240C, and then, it extends through fourth ⊓-type section 240C and forms fifth ⊓-type section 240B and sixth ⊓-type section 240A in order. The fourth ⊓-type section 240C, fifth ⊓-type section 240B, and sixth ⊓-type section 240A are connected with each other orderly to form second sawtooth-shaped area 260B, and the indents of fourth ⊓-type section 240C, fifth ⊓-type section 240B, and sixth ⊓-type section 240A open toward a same direction, which is opposite to the direction that the indents of first ⊓-type section 230A, second ⊓-type section 230B, and third ⊓-type section 230C open toward. Finally, induction loop 200 is connected with a common contact 220 through sixth ⊓-type section 240A. The first ⊓-type section 230A and the sixth ⊓-type section 240A, having indents of opposite opening directions, form a first close-like area 250A; the second ⊓-type section 230B and the fifth ⊓-type section 240B, having indents of opposite opening directions, form a second close-like area 250B; the third ⊓-type section 230C and the fourth ⊓-type section 240C, having indents of opposite opening directions, form a third close-like area 250C.

Referring to FIG. 3B still, when the plurality of close-like areas 250A to 250C have the opposite phase (or out of phases), the above-mentioned multi-induction loop 200 is formed in a staggered way, which is described as follows: first, the induction loop 200 extends upwardly from the switch 210 and form first ⊓-type section 230A, then, it extends through first ⊓-type section 230A and forms fifth ⊓-type section 240B, opening direction of indent of first ⊓-type section 230A being opposite to opening direction of indent of fifth ⊓-type section 240B and opening direction of indent of third ⊓-type section 230C and opening direction of indent of first ⊓-type section 230A being the same. Then, multi-induction-loop 200 extends downwardly from third ⊓-type section 230C to form fourth ⊓-type section 240C, and then, it extends through fourth ⊓-type section 240C and forms second ⊓-type section 230B in order. The opening direction of indent of fourth ⊓-type section 240C is opposite to opening direction of indent of third ⊓-type section 230C, the opening direction of indent of second ⊓-type section 230B and opening direction of indent of third ⊓-type section 230C are the same, and the opening direction of indent of second ⊓-type section 230B is opposite to opening direction of indent of fourth ⊓-type section 240C. Then, multi-induction-loop 200 extends from second ⊓-type section 230B and forms sixth ⊓-type section 240A, opening direction of indent of sixth ⊓-type section 240A being opposite to opening direction of indent of first ⊓-type section 230A and opening direction of indent of sixth ⊓-type section 240A and opening direction of indent of fifth ⊓-type section 240B being the same. Finally, induction loop 200 is connected with a common contact 220 through sixth ⊓-type section 240A.

Besides, the first ⊓-type section 230A, second ⊓-type section 230B, and third ⊓-type section 230C, having opposite phases, form first sawtooth-shaped area 260A, and the fourth ⊓-type section 240C, fifth ⊓-type section 240B, and sixth ⊓-type section 240A, having opposite phases, form second sawtooth-shaped area 260B. Moreover, the first ⊓-type section 230A and sixth ⊓-type section 240A, having the same phases, form a first close-like area 250A; the second ⊓-type section 230B and fifth ⊓-type section 240B, having the same phases, form a second close-like area 250B; and, the third ⊓-type section 230C and fourth ⊓-type section 240C, having the same phases, form a third close-like area 250C.

According to what is said above, this multi-induction-loop is a "physical induction loop," and induction loops of close-like areas 250A, 250B, and 250C formed by it are a plurality of "logical induction loops." That is to say, a physical direction loop will comprise a plurality of logical direction loops, and this is also the reason why the present technique is called "induction loop." And, the adjacent close-like areas 250A, 250B, and 250C have opposite phases. When the multi-induction-loop 220 is interfered by external electromagnetic field, a voltage of opposite properties will be produced by the adjacent close-like areas 250A, 250B, and 250C of opposite phases. Therefore, the deployment of this multi-induction-loop 200 has the function of eliminating interference of external noise signal.

Figure 3C:
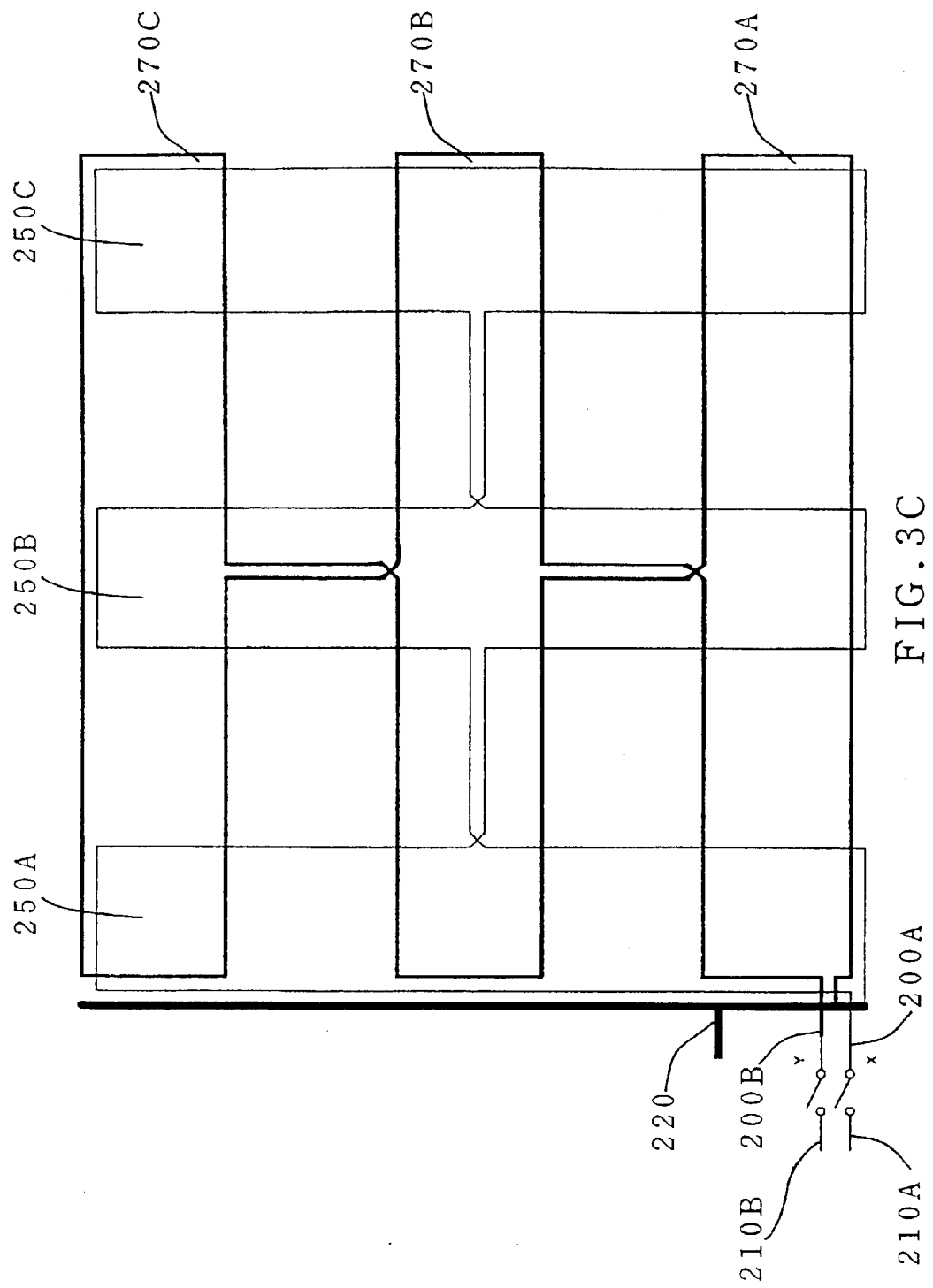
FIG. 3C is a diagram of deployment of multi-induction-loop in electromagnetic induction system according to the present invention.

FIG. 3C is a diagram of multi-induction-loop 200 of the present invention deployed in electromagnetic induction system. Its induction loops 200A and 200B are deployed in the direction of X axis and Y axis. Induction loops having opposite phases in the direction of X axis and Y axis are formed by a plurality of close-like areas 250A, 250B, and 250C, and 270A, 270B, and 270C in a staggered way. One end of induction loops 200A and of 200B are connected with a common contact respectively, and the other end of induction loops 200A and of 200B are connected with switch 210A and 210B respectively.

Besides, it should be noticed that the distance between two adjacent logical induction loops should be appropriate. (Take distance "L" between two adjacent logical direction loops 230A and 230B for example.) If the distance L is too short, misjudgment can be caused easily while identifying the location of pointer device.

In the above-mentioned embodiment of the present invention, each physical induction loop can again form a ⊓-type logical induction loop after coiling a plurality of circles, which can enhance the intensity of electromagnetic signal transmitted by the physical induction loop. And, the intensity of voltage signal of the induction loop can be enhanced by using a ⊓-type logical induction loop formed by each physical induction loop after coiling a plurality of circles, and the stability of system can be greatly increased using electromagnetic induction system of the present invention that has excellent ability of interference immunity.

As is described above, in the present invention, deployment of a plurality of single induction loops is inserted in an electromagnetic induction system in which multi-inductionloop is deployed. In the present invention, the number of switch in use is decreased and induction loops of X axis and Y axis are deployed totally on a same common contact by multi-induction-loop composed by induction loops having sawtooth-shaped areas and close-like areas formed by ⊓-type sections of same and opposite phases. Therefore, the present invention can effectively reduce area demand of electromagnetic induction system, and thus increase effective area of panel board in use. Moreover, in order to further enhance ability of interference immunity of electromagnetic induction system, in the present invention a plurality of single-induction-loops are inserted around multi-induction-loop for isolating interference of noise to multi-induction-loop. Therefore, when single-induction-loops on the margin of electromagnetic induction system are interfered by noise signal, only part of single-induction-loops are affected and the part of induction loops at central part of electromagnetic system will not be affected. Thus, this deployment with single induction loops and induction loops can relatively enhance linearity and efficiency of electromagnetic induction system.

Obviously, there may be many modifications and differences in the present invention according to the description of the embodiments mentioned above. Therefore it needs to be explained in the appended claims that, in addition to the detailed description given above, The present invention can also be applied extensively in other embodiments.

What is mentioned above is only the preferred embodiments of the present invention that cannot define the claims of the present invention. Any equivalent changes or modifications made without departing from the true spirit disclosed by The present invention should be included in the scope of the appended claims.

What is claimed is:

1. An electromagnetic induction system having single-induction-loops and multi-induction-loop, comprising:
    a single-induction-loop, deployed along left and right side of X axis and upper and lower side of Y axis, one end of said single-induction-loop being electrically connected with a first switch assembly and the other end of said single-induction-loop being electrically connected with a common contact to form independent ⊓-type section;
    a multi-induction-loop, which further comprising:
        a plurality of first induction loops, deployed along the direction of X axis, one end of said a plurality of first induction loops being electrically connected with a second switch assembly and the other end of said a plurality of first induction loops being electrically connected with a common contact, and each of said first induction loops having a plurality of close-like areas;
        a plurality of second induction loops, deployed along the direction of Y axis, one end of said a plurality of second induction loops being electrically connected with a third switch assembly and the other end of said a plurality of second induction loops being electrically connected with a common contact, and each of said second induction loops having a plurality of close-like areas;
        a common contact, being electrically connected with said single-induction-loop and said plurality of first induction loops and said plurality of second induction loops respectively;
    a first switch assembly, being electrically connected with a plurality of single-induction-loops;
    a second switch assembly, being electrically connected with said plurality of first induction loops;
    a third switch assembly, being electrically connected with said plurality of second induction loops.

2. The electromagnetic induction system of claim 1, wherein said single-induction-loop is composed of a plurality of induction loops.

3. The electromagnetic induction system of claim 1, wherein each close-like area in said multi-induction-loop is composed of two ⊓-type sections of opposite openings.

4. The electromagnetic induction system of claim 1, wherein said plurality of close-like areas have the same phases.

5. The electromagnetic induction system of claim 4, wherein same phases of said plurality of close-like areas are formed in an un-staggered way.

6. The electromagnetic induction system of claim 1, wherein said plurality of close-like areas have opposite phases.

7. The electromagnetic induction system of claim 6, wherein opposite phases of said plurality of close-like areas are formed in a staggered way.

8. The electromagnetic induction system of claim 1, wherein said plurality of first induction loops and said plurality of second induction loops are alternately deployed along the direction of X axis and Y axis in order.

9. The electromagnetic induction system of claim 1, wherein ⊓-type section formed by said single-induction-loop and close-like area formed by said plurality of first induction loops and said plurality of second induction loops overlap each other.

10. The electromagnetic induction system of claim 1, wherein said first switch and said second switch are both analog multi-channel selective switches.

11. An electromagnetic induction system having single-induction-loops and multi-induction-loop, comprising:
    a single-induction-loop, formed by two directions deployed along left and right side of X axis and upper and lower side of Y axis, one end of said single-induction-loop being electrically connected with a first switch assembly and the other end of said single-induction-loop being electrically connected with a common contact to form independent ⊓-type section;
    a multi-induction-loop, which further comprising:
        a plurality of first induction loops, deployed along the direction of X axis, one end of said a plurality of first induction loops being electrically connected with a second switch assembly and the other end of said a plurality of first induction loops being electrically connected with a common contact, and each of said first induction loops having a plurality of close-like areas;
        a plurality of second induction loops, deployed along the direction of Y axis, one end of said a plurality of second induction loops being electrically connected with a third switch assembly and the other end of said a plurality of second induction loops being electrically connected with a common contact, and each of said second induction loops having a plurality of close-like areas;
        a common contact, being electrically connected with said single-induction-loop and said plurality of first induction loops and said plurality of second induction loops respectively;
    a first switch assembly, being electrically connected with said plurality of first single-induction-loops;
    a second switch assembly, being electrically connected with said plurality of first induction loops;

a third switch assembly, being electrically connected with said plurality of second induction loops.

12. The electromagnetic induction system of claim 11, wherein each close-like area in said multi-induction-loop is composed of two ⊓-type sections of opposite openings.

13. The electromagnetic induction system of claim 11, wherein said plurality of close-like areas have the same phases.

14. The electromagnetic induction system of claim 13, wherein same phases of said plurality of close-like areas are formed in an un-staggered way.

15. The electromagnetic induction system of claim 11, wherein said plurality of close-like areas have opposite phases.

16. The electromagnetic induction system of claim 15, wherein opposite phases of said plurality of close-like areas are formed in a staggered way.

17. The electromagnetic induction system of claim 11, wherein said plurality of first induction loops and said plurality of second induction loops are alternately deployed along the direction of X axis and Y axis in order.

18. The electromagnetic induction system of claim 11, wherein ⊓-type section formed by said single-induction-loop and close-like area formed by said plurality of first induction loops and said plurality of second induction loops overlap each other.

19. The electromagnetic induction system of claim 11, wherein said first switch and said second switch are both analog multi-channel selective switches.

20. The electromagnetic induction system of claim 11, wherein said common contact is electrically connected with ground contact of said electromagnetic induction system.

* * * * *